United States Patent [19]

Miwa et al.

[11] 3,710,349

[45] Jan. 9, 1973

[54] DATA TRANSFERRING CIRCUIT ARRANGEMENT FOR TRANSFERRING DATA BETWEEN MEMORIES OF A COMPUTER SYSTEM

[75] Inventors: Osamu Miwa, Sagamihara; Yosiro Kayano, Yokohama, both of Japan

[73] Assignee: Fujitsu Limited, Kawasaki, Japan

[22] Filed: May 5, 1971

[21] Appl. No.: 140,601

Related U.S. Application Data

[63] Continuation of Ser. No. 827,316, May 23, 1969, abandoned.

[30] Foreign Application Priority Data

May 25, 1968 Japan ................................43/35407

[52] U.S. Cl. ................................................340/172.5
[51] Int. Cl. ................................................G06f 3/00
[58] Field of Search ....................................340/172.5

[56] References Cited

UNITED STATES PATENTS

| | | | |
|---|---|---|---|
| 3,411,139 | 11/1968 | Lynch et al. | 340/172.5 |
| 3,413,613 | 11/1968 | Bahrs et al. | 340/172.5 |
| 3,525,080 | 8/1970 | Couleur et al. | 340/172.5 |

*Primary Examiner*—Harvey E. Springborn
*Attorney*—Curt M. Avery, Arthur E. Wilfond, Herbert L. Lerner and Daniel J. Tick

[57] ABSTRACT

Data transferring means separate and independent from the central processing unit of a computer system and operating in parallel with the central processing unit transfers data between a first memory area and a second memory area in a memory. The data transferring means comprises a first register for storing the address of the data of the first memory area from which the data is successively transferred to the second memory area. A second register stores the address of the data of a second memory area to which the data is successively transferred from the second memory area. A third register stores addresses of the group of data transferred from the first memory area to the second memory area. Transfer means transfers data directly to the second position in the second memory area designated by the address information of the second register. First arithmetic means connected to the first register and the second register modifies the address information of the first register and the second register by the information of the transfer data. Second arithmetic means connected to the third register modifies the address information of the transfer data.

1 Claim, 4 Drawing Figures

DATA TRANSFERRING CIRCUIT ARRANGEMENT FOR TRANSFERRING DATA BETWEEN MEMORIES OF A COMPUTER SYSTEM

DESCRIPTION OF THE INVENTION

This is a continuation of application Ser. No. 827,316, filed May 23, 1969, and relates to a computer system for processing data stored therein. More particularly, the invention relates to a data transferring circuit arrangement for transferring data between memories of a computer system for processing data stored therein.

The computer system of the present invention is a digital computer which comprises a plurality of main memories or core memory matrices or arrays. In known methods of data transfer or dynamic relocation of data between main memories of the computer, data is transferred between said memories by the data processing operation of a central processing unit. An inherent difficulty is that the essential operation of the central processing unit cannot be fully utilized and considerable time is wasted.

In a computer system utilizing a core memory array, the transfer of data from one region in the core memory array to another, known as dynamic relocation of data, is frequently undertaken. Programs or data are transferred very frequently within a memory, particularly in a system which provides positive multiprogramming. The transfer of data in a memory is performed by first transferring the data to a processing register separate from the memory and then transferring the data to the desired address in either the same or another memory.

The dynamic relocation of data within a single memory, or between different memories, as hereinbefore described, is accomplished in known computer systems under the control of a central processing unit, or, more particularly, under the control of a processing or memory register in the central processing unit. For this reason, the central processing unit cannot execute other commands until the transfer of the data is completely accomplished. In a computer system having a small number of memories operating independently, however, no problem will arise even if the central processing unit is utilized exclusively for the transfer of data. This is due to the fact that in such a system, during the transfer of data, the memories themselves are occupied with the same function, so that there is almost no possibility that the central processing unit will be required to perform other commands.

In a computer system utilizing a plurality of central processing units, a plurality of channel control units and/or a plurality of input-output controllers, circumstances change due to the common use of a plurality of core memories. In such a computer system, there is a great possibility that during the transfer of data, some of the memories remain unassociated with such data transfer. In this case, if the central processing unit is not exclusively occupied by the command, said central processing unit may perform other commands or programs in parallel operation with the transfer of data. This would considerably reduce the cost of operation of the computer system as a whole.

It is advantageous to transfer data between the memory unit independently of the central processing unit. It has been proposed to utilize a memory unit of large capacity in order to assist the main memory unit to enable large capacity storage without losing the high speed access time of the main memory unit. However, since in all arrangements hereinbefore described, data is transferred between the main memory unit and the large capacity memory unit via the central processing unit, the processing speed is substantially the same as in a conventional system.

In the present invention, however, since the data may be transferred between the main memory devices independently of the central processing unit, it is possible to utilize the main memory unit practically as a large capacity memory device and to increase the processing speed significantly.

The principal object of the present invention is to provide a new and improved data transferring circuit arrangement.

An object of the present invention is to provide a new and improved data transferring circuit arrangement for transferring data between memories of a computer system for processing data stored therein.

An object of the present invention is to provide a data transferring circuit arrangement for transferring data within a single memory or between a plurality of memories in parallel operation relative to the operation of the central processing unit of a computer system.

Another object of the present invention is to provide a data transferring circuit arrangement for transferring data between a plurality of memories and within a single memory.

Another object of the present invention is to provide a channel control unit or an input-output controller circuit arrangement for transferring data within a single memory or between a plurality of memories.

An object of the present invention is to provide a channel control unit or input-output controller circuit arrangement which operates in parallel with and independently from the central processing unit of a computer system for transferring data in parallel with the operation of the central processing unit.

Another object of the present invention is to provide a data transferring circuit arrangement for transferring data between the main memories of a computer system in parallel with data processing operation of the central processing unit of the computer system thereby enabling the central processing unit to process data at high efficiency and resulting in greater economy of operation of the computer system.

In accordance with the present invention, dynamic relocation of data between main memories or between regions of a single main memory of a computer system is executed by an input-output controller which is not in operation. The operation of the input-output controller to dynamically relocate data is independent from the operation of the central processing unit and results in great economy in operation.

The circuit arrangement of the present invention may be utilized as an individual data transferring circuit arrangement or may be a simple modification of a conventional channel control unit or a conventional input-output controller. The utilization of an input-output controller rather than a channel control unit, results in even greater economy in operation.

In accordance with the present invention, a data transferring circuit arrangement is included in computer system for processing data stored therein. The computer system has a plurality of main memories storing the data and at least one central processing unit. The data transferring circuit arrangement transfers data between memories of the computer system. The data transferring circuit arrangement comprises a circuit separate from the central processing unit for storing a first address information for designating a first memory position of the main memories and a second address information for designating a second memory position and for receiving data directly from the first memory position designated by the first address information and for transferring data directly to the second memory position designated by the second address information. The circuit thereby dynamically relocates data from a first memory position to a second memory position in the main memories of the computer system.

The circuit comprises a first register for storing the first address information, a second register for storing the second address information, a third register for intermediately storing the transferred data and a control circuit for controlling the first, second and third registers.

The circuit is separate and independent from the central processing unit and operates in parallel with the central processing unit. The circuit includes an input-output controller circuit.

The circuit comprises a control register having a first register for storing the first address information and a second register for storing the second address information. An arithmetic circuit connecting to the first register adds 1 to the first address information and an arithmetic circuit connected to the second address information subtracts 1 from the second address information.

In order that the present invention may be readily carried into effect, it will now be described with reference to the accompanying drawings, wherein.

Figure 1:
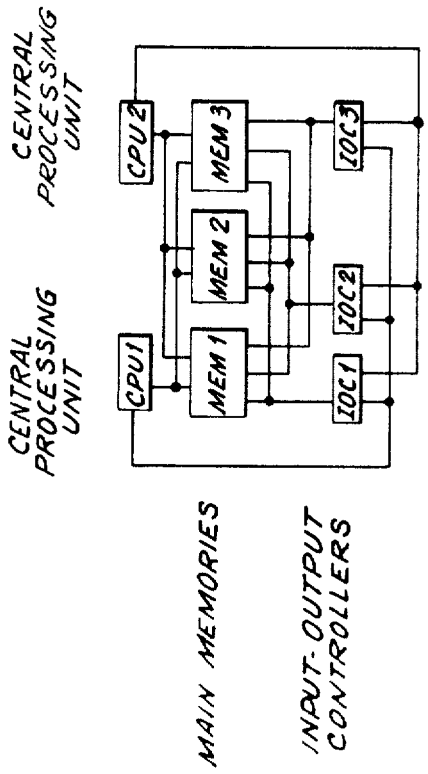
FIG. 1 is block diagram of an embodiment of a computer system for processing data which may utilize the data transferring circuit arrangement of the present invention.

In FIG. 1, the computer system comprises two central processing units CPU1 and CPU2, three main memories MEM1, MEM2 and MEM3, and three input-output controller IOC1, IOC2 and IOC3. Either any or all three input-output controllers may transfer data. Another alternative is that one of the input-output controllers may not function essentially as an input-output controller, but may be capable only of transferring data. The main memories may be a large capacity core storage.

Figure 2:
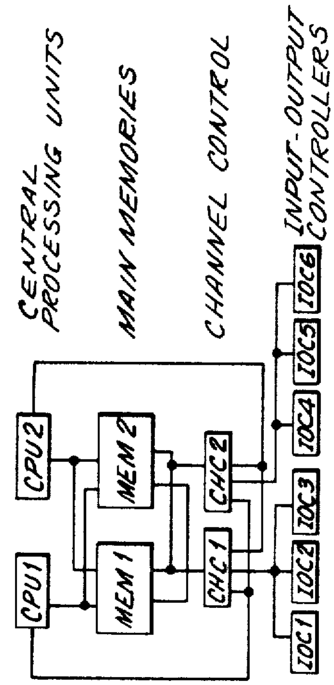
FIG. 2 is a block diagram of another embodiment of a computer system for processing data which may utilize the data transferring circuit arrangement of the present invention.

In FIG. 2, the computer system comprises two central processing units CPU1 and CPU2, two main memories MEM1 and MEM2, two channel controls CHC1 and CHC2 and six input-output controllers IOC1, IOC2, IOC3, IOC4, IOC5 and IOC6. Either all of the control channels may transfer data or only one of said control channels may transfer data. Alternatively, either all or only one of the input-output controllers may transfer data. One of the input-output controllers may function exclusively for transfer of data.

A plurality of input-output devices such as, for example, magnetic tape devices, may be included in each computer system. The input-output devices are not shown in FIGS. 1 and 2, although in actuality a plurality of input-output devices are connected to each input-output controller in FIGS. 1 and 2.

Figure 3:
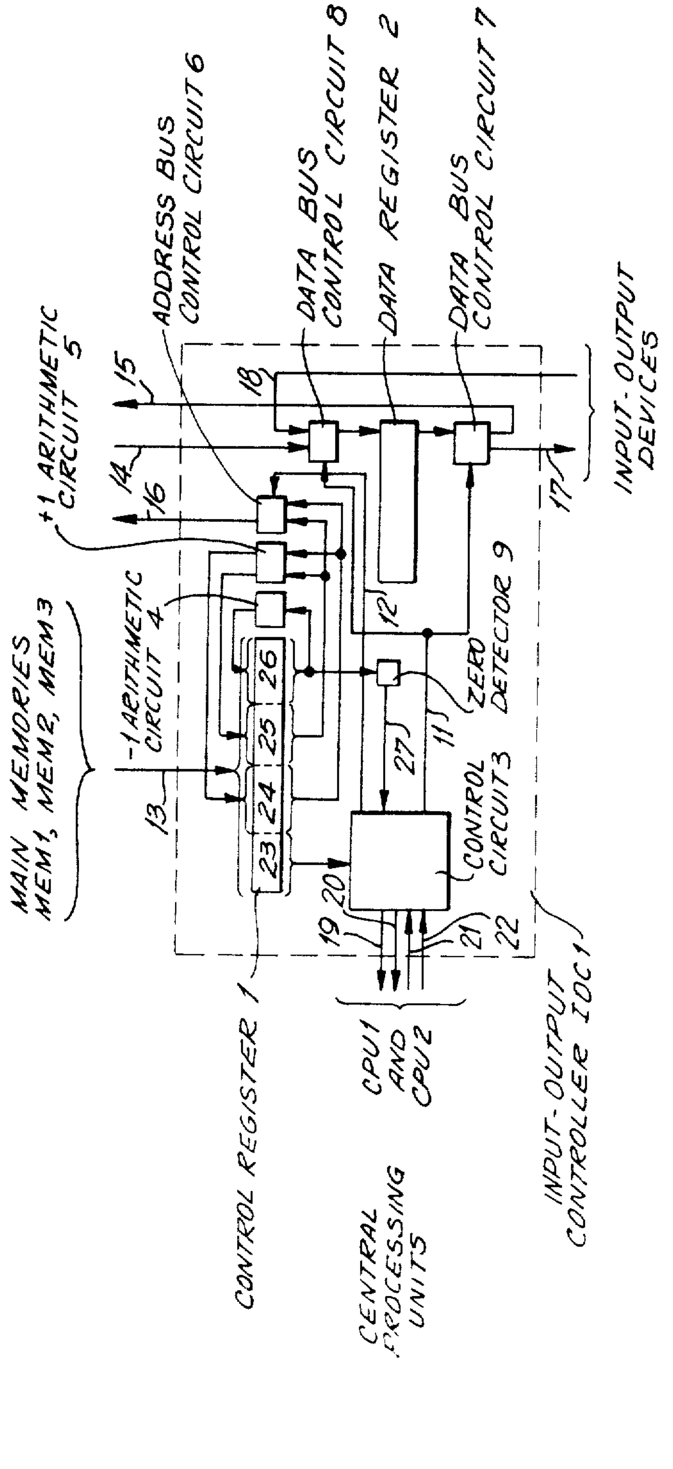
FIG. 3 is a block diagram of an embodiment of the data transferring circuit arrangement of the present invention.

FIG. 3 is a block diagram of the data transferring circuit arrangement of the present invention. The circuit arrangement of FIG. 3 comprises control register 1, a data register 2, a control circuit 3, a −1 arithmetic circuit 4, a +1 arithmetic circuit 5, an address bus control circuit 6, a data bus control circuit 7, a data bus control circuit 8 and a zero detector 9. As hereinbefore described, the data transferring circuit arrangement of FIG. 3 may be included within an input-output controller or a channel control, or may be utilized as a separate circuit arrangement exclusively for for data transfer.

In the embodiment of FIG. 3, the data transferring means of the present invention is provided within the input-output controller IOC1 of the computer system of FIG. 1. For this reason, many components of the initial input-output controller are utilized in the data transferring circuit arrangement. These components include the control register 1, the data register 2, the control circuit 3, the −1 arithmetic circuit 4, the +1 arithmetic circuit 5 and the address bus control circuit 6. The data transferring circuit arrangement of FIG. 3 may thus be provided by modifying the circuitry of the control circuit 3, the address bus control circuit 6, the data bus control circuit 7, the data bus control circuit 8 and signal lines 11 and 12 which control the data bus control circuits 7 and 8, respectively, in order to control the transfer data.

The main memories MEM1, MEM2 and MEM3 of FIG. 1 and the central processing units CPU1 and CPU2 are connected to the input-output controller IOC1 in the manner shown in FIG. 1. A plurality of input-output devices such as, for example, magnetic tape devices, may be connected to the input-output controller IOC1. In FIG. 3, lines 13, 14, 15, 16, 17 and 18 are cables, each of which comprises plurality of wires through which data or address information comprising several bits may be transferred simultaneously or in parallel with each other. The cables 13, 14, 15, 17 and 18 are referred to as data busses and the cable 16 is referred to as the address bus.

Lines 19, 20, 21 and 22 indicate control lines through which interrupt signals, start signals, end signals or condition test signals are transmitted and received between the input-output controller IOC1 and the central processing units CPU1 and CPU2. The lines 19 and 21 are connected to the central processing unit CPU1 and the lines 20 and 22 are connected to the central processing unit CPU2. As indicated in FIG. 1, the data busses and the address bus are connected to the main memories MEM1, MEM2 and MEM3. The input-output devices (not shown in FIG. 3) may be connected either in series or in parallel circuit arrangement.

In operation for the transfer of data, transfer control information is read out of a main memory and is registered in the control register 1. As shown in FIG. 3, this transfer of control information is accomplished via the cable 13. The contents of the control information or command information, which controls the input and output, are registered in the control register 1.

The control register 1 is divided into four regions 23, 24, 25 and 26. The first region 23 of the control register 1 is that in which the content of the control information is registered, and is referred to as the operation region. The second region 12 of the control register 1 is that in which the address of the transferor is registered, and is referred to as the first address region. The third region 25 is that in which the address of the transferee is registered, and is referred to as the second address region. The fourth region 26 indicates the number of words transferred, and is referred to as the word length designating region.

The control information, order or command comprises a plurality of bits and commands of the input-output controller to perform various operations. One of these commands is for a data transfer operation. When the command decoding circuit (not shown in FIG. 3) of the control circuit 3 determines that such a command has been given, the input-output controller immediately executes a data transfer operation. When the data transfer command is given, the address of the transferor is immediately transmitted from the region 24 of the control register 1 to the address selecting mechanism of a main memory via the address bus control circuit 6 and the address bus 16. If the main memory is not then being utilized by the other input-output controllers or central processing units, there is immediate access to the transmitted address information. The content, data or information of the address is read out of the main memory and is transferred to the data register 2 via the data bus control circuit or gate 8.

After the transfer of the address information, the content of the region 25 of the control register 1 may be transferred to the main memory via the address bus control circuit 6 and the address bus 16. The content of the region 25 is the address of the transferee, so that if the main memory corresponding to the transferee is not being utilized by any of the central processing units and input-output controllers, there is immediate access to the address of the transferee. At the same time, the data registered in the data register 2 is transferred through the data bus control circuit 7 and is written into the transferred address of the transferee.

The aforedescribed operation is for the transfer of a single address or word. Dynamic relocation of continuous addresses, that is, a plurality of words, may be accomplished by repetition of the transfer of a single word as hereinbefore described, in the following manner. When a word is transferred, the contents of the control register 1 are changed by adding +1 to the content of the region 24 and replacing said content. The +1 arithmetic circuit 5 functions to add +1 to the content of the region 24. Furthermore, +1 is also added to the content of the region 25 and said content is replaced. The +1 arithmetic circuit 5 adds +1 to the content of the region 25.

Due to the adding of +1 to the content of each of the regions 24 and 25 of the control register 1, in the next cycle of operation, data transfer is performed on the basis of an address provided by adding +1 to the initially registered address. By performing data transfer, step by step, in the aforedescribed manner, dynamic relocation of continuous addresses or a plurality of words may be accomplished.

The end of an information is indicated from the designation of the length of the information stored in the region 26 of the control register 1. Each time a word is transferred, 1 is subtracted by the −1 arithmetic circuit 4. When zero is reached, the transfer operation is completed. The reaching of zero in the region 26 of the control register 1 is determined by the zero detector 9. The signal indicating the detection of zero in the region 26 of the control register 1 is supplied to the control circuit 3 by the zero detector 9 via a line 27 and indicates the end of the data transfer.

The end of the operation of the data transfer circuit is also indicated to the corresponding central processing unit CPU1 or CPU2 via the line 19 or 20. The central processing unit to which the end signal is transmitted immediately advises the related program of the end or termination of the data transfer, so that said program may start again. This is related to the interrupt operation of programs. The interrupt technique, although well known in the computer art, is described hereinafter.

Figure 4:
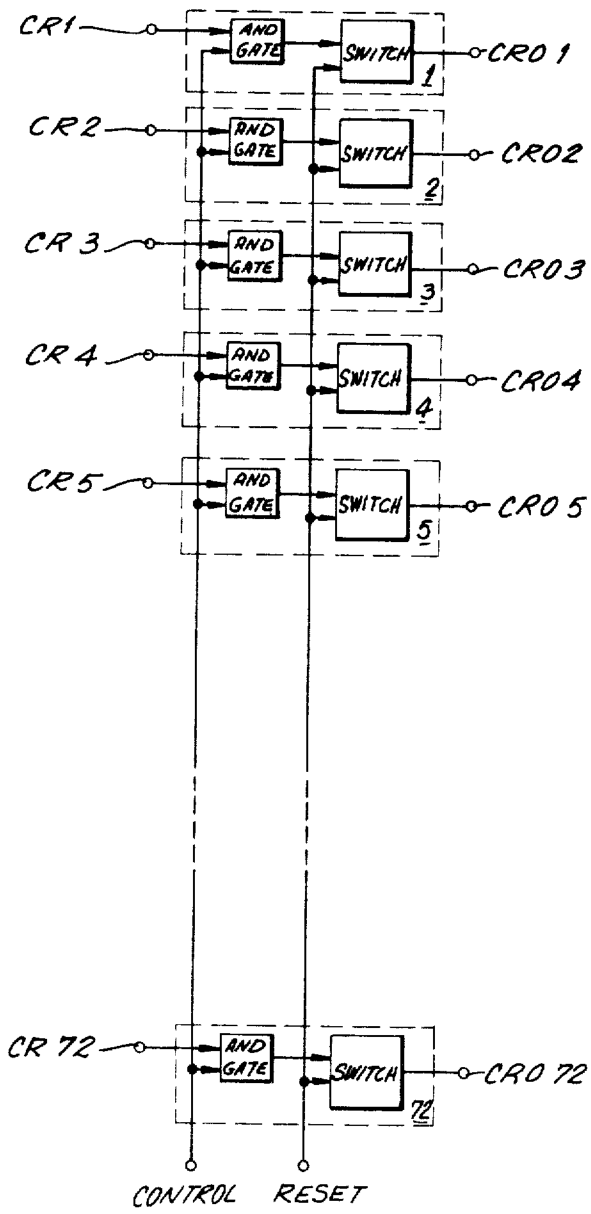
FIG. 4 is a schematic block diagram of a control register which may be utilized as the control register of the data transferring circuit arrangement of FIG. 1.

The structure of the control register 1 of FIG. 3 is shown in, and described with reference to, FIG. 4. In FIG. 4, the control register is capable of storing 72 digit binary numbers, referred to as 72 bits. The first to 19th bits register the contents of the control, corresponding to the first region 23 of FIG. 3. The 20th to 38th bits register the address of the transferor, corresponding to the second region 24 of FIG. 3. The 39th to 55th bits register the address of the transferee, corresponding to the third region 25 of FIG. 3. The 56th to 72nd bits register the number of words transferred, corresponding to the fourth region 26 of FIG. 3.

The control register has a plurality of input terminals CR1 to CR72 which are all connected to receive signals from the control information input bus 13 of FIG. 3. The control register 1 of FIG. 4 has a plurality of output terminals CRO1 to CRO72 connected to the input of the control circuit 3 of FIG. 3. The output terminals CRO20 to CRO38 of FIG. 4 are connected in common to the input of the +1 arithmetic circuit 5 and the address bus control circuit 6 of FIG. 3. The output terminals CRO39 to CRO55 of the control register of FIG. 4 are connected in common to the input of the +1 arithmetic circuit 5 and the address bus control circuit 6 of FIG. 3. The output terminals CRO56 to CRO72 of the control register of FIG. 4 are connected in common to the input of the −1 arithmetic circuit 4 and to the input of the zero detector 9 of FIG. 3.

The data register 2 is similar in structure to the control register 1. Each of the +1 arithmetic circuit 5 and the −1 arithmetic circuit 4 comprises a well known circuit. Each of the address bus control circuit 6, the data bus control circuit 7 and the data bus control circuit 8 comprises a known AND or coincidence gate circuit. The control circuit 3 is well known in the computer art and comprises a decoder and various types of gate circuits. A suitable control circuit is that described in "Electronic Computer Easy to Understand," published in Japan Apr. 20, 1964, page 206, FIG. 10.7. This book was authored by Hiroyuki Watanabe and published by The Sanpo Inc.

Instructions stored in the instruction register are first read by a decode circuit shown on page 206, FIG. 10.6 of the aforedescribed Japanese textbook. Thereafter, the instructions are supplied to the control circuit shown in FIG. 10.7 of said Japanese textbook. In the control circuit, each gate is controlled by the signal supplied from the decode circuit and a control signal controlling each of the other circuits is sent out.

The data register 2 of FIG. 3 is shown in the "Register Circuit" of pages 85 to 87 of a textbook entitled "Introduction to Digital Computers" by G. A. Maley and M. F. Heilweil, Prentice-Hall, Inc., 1968. The data bus control circuit 7, 8 and the address bus control circuit 6 are shown in the "Diode AND Circuit" of pages 35–37 of the aforedescribed textbook. The +1 arithmetic circuit 5 is shown in the "Binary Adder" of pages 115–118 of the aforedescribed textbook. The −1 arithmetic circuit 4 is shown in the "Subtraction Circuit" of pages 120 and 121 of the aforedescribed textbook.

In accordance with the interrupt technique, a program or command being performed in a central processing unit is halted in mid performance and another program is performed in its stead. There is no order of priority among the plurality, of programs or commands, and a program of lower priority may not interrupt while a program of higher priority is being performed or executed. This technique is utilized in the computer art. In the data transferring circuit arrangement of the present invention, signal pulses in the lines 19 and 20 of FIG. 3 provide the control for causing one program to interrupt another program which is being executed in the central processing unit CPU1 or CPU2. If a central processing unit is executing a program for data transfer, the program under execution is halted and the program relating to data transfer is started immediately.

Adversely, when a data transfer program is executed and it is desired to execute another program, when the input-output controller IOC1 is utilized by the other program, that is, either a central processing unit, which is one of the central processing units CPU1 or CPU2 of FIG. 1, or a main memory, the input-output controller IOC1 being in its best condition, the other program cannot be accepted. When the input-output controller IOC1 is no longer busy, however, the other program may be executed immediately. The program to be executed is advised of the end of the program being executed in the same manner as in the aforedescribed interrupt operation, so that the program to be executed consequently replaces the program being executed. The command succeeding the program to be executed is for data transfer. This command reads out the control data or command provided in the predetermined address of the main memory and transfers such control data to the control register 1 of the data transferring circuit arrangement of FIG. 3.

After the control register 1 of the input-output controller IOC1 of FIG. 3 is set to perform the data transfer operation, the program to be executed is placed in interrupted condition until the end signal of the data transfer is provided. This means that the central processing unit may perform another program. This is an essential feature of the data transferring circuit arrangement IOC1 to IOC3 of FIG. 1 of the present invention. A conventional computer system cannot execute or perform another program in such a situation, whereas the circuit arrangement IOC1 to IOC3 of FIG. 1 of the present invention is able to execute or perform another program. In a conventional computer system, the central processing unit is utilized exclusively for a long period of time by the dynamic relocation which requires such long period of time. In the data transferring circuit arrangement of the present invention, however, the central processing unit CPU1 and CPU2 may always process with a high degree, such as arithmetic operation, so that the cost of operation of the central processing unit may be considerably reduced.

The content of the region 23 of the control register 1 of FIG. 3 is not always a command for data transfer. It may be a command for the transmission and reception of data between input-output devices. From the point of view of the essential function of the input-output controller, the commands to control input-output devices are more frequently give, so these will explained, although not related to the present invention.

A decoder included in the region 23 of the control register 1 determines whether the content of said region 23 is a command for data transfer or a command for data transfer to or from an input-output device. The decoder supplies a signal to the control circuit 3, which then controls the execution of the decoded command. If data transfer is commanded, the data bus control circuit 8 connects the data register 2 to the data output bus 14 and the data bus control circuit 7 connects said data register 2 to the data input bus 15. If a data transfer from a main memory to an input-output device is commanded, the data bus control circuit 8 connects the data output bus 14 to the data register 2 and the data bus control circuit 7 connects said data register to the input-output bus 16. If a data transfer from an input-output device to a main memory is commanded, the data bus control circuit 8 connects the input-output bus 18 to the data register 2 and the data bus control circuit 7 connects said data register to the data input bus 15. The operations are under the control of the control circuit 3 via the line 11 and the data bus control circuits 7 and 8.

The numbers of the input-output devices are selected by input-output detecting and selecting busses connected to said input-output devices, and not shown in the FIGS. In controlling the input-output devices, information for selecting the numbers of said input-output devices are set in the second address region 24 of the control register of FIG. 3. In this case, the control is undertaken via the line 12.

While the invention has been described by means of specific examples and in a specific embodiment, we do not wish to be limited thereto, for obvious modifications will occur to those skilled in the art without departing from the spirit and scope of the invention.

We claim:

1. In a computer system for processing data stored therein, said computer system having at least one central processing unit, memory means including first and second memory areas, data transferring means separate and independent from the central processing unit and operating in parallel with the central processing unit for transferring data between the first memory area and the second memory area in the memory means, said data transferring means comprising a first register for storing the address of the first memory area from which said data is successively transferred to the second memory area, a second register for storing the address of the second memory area to which said data is successively transferred from the second memory area, a third register for storing addresses of data groups transferred from the first memory area to the second memory area, receiving means for receiving data directly from the position in the first memory area designated by the address information of the first register, transfer means for transferring data directly to the position in the second memory area designated by the address information of the second register, first arithmetic means connected to the first register and the second register for modifying the address information of the first register and the second register by the transferred data, and second arithmetic means connected to the third register for modifying the address information of the transferred data.

* * * * *